(12) United States Patent
Loh et al.

(10) Patent No.: US 8,621,131 B2
(45) Date of Patent: Dec. 31, 2013

(54) UNIFORM MULTI-CHIP IDENTIFICATION AND ROUTING SYSTEM

(75) Inventors: Gabriel H. Loh, Bellevue, WA (US); Bradford M. Beckmann, Redmond, WA (US); Jaewoong Chung, Sunnyvale, CA (US); Subho Chatterjee, Atlanta, GA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 176 days.

(21) Appl. No.: 13/221,465

(22) Filed: Aug. 30, 2011

(65) Prior Publication Data

US 2013/0054849 A1    Feb. 28, 2013

(51) Int. Cl.
*G06F 13/00*    (2006.01)

(52) U.S. Cl.
USPC .............................. 710/316; 370/351; 438/107

(58) Field of Classification Search
USPC .................. 370/351, 355, 362, 387; 438/107; 710/301, 305, 316, 107
See application file for complete search history.

(56) References Cited

U.S. PATENT DOCUMENTS

| | | | |
|---|---|---|---|
| 6,842,443 B2 * | 1/2005 | Allen et al. | 370/335 |
| 7,198,980 B2 | 4/2007 | Jiang et al. | |
| 7,522,538 B2 * | 4/2009 | Rhim et al. | 370/254 |
| 8,189,612 B2 * | 5/2012 | Lemaire et al. | 370/463 |
| 8,296,459 B1 * | 10/2012 | Brandwine et al. | 709/241 |
| 8,300,641 B1 * | 10/2012 | Vincent et al. | 370/392 |
| 2003/0189924 A1 * | 10/2003 | Kadambi et al. | 370/360 |
| 2005/0167798 A1 | 8/2005 | Doan | |
| 2008/0016243 A1 * | 1/2008 | Basso et al. | 709/238 |
| 2012/0319717 A1 * | 12/2012 | Chi | 324/756.05 |

* cited by examiner

Primary Examiner — Glenn A Auve
(74) Attorney, Agent, or Firm — Timothy M. Honeycutt

(57) ABSTRACT

Various methods, computer-readable mediums, articles of manufacture and systems are disclosed. In one aspect, a method is provided that includes generating a packet with a first semiconductor chip. The packet is destined to transit a first substrate and be received by a node of a second semiconductor chip. The packet includes a packet header and packet body. The packet header includes an identification of a first exit point from the first substrate and an identification of the node. The packet is sent to the first substrate and eventually to the node of the second semiconductor chip.

21 Claims, 5 Drawing Sheets

UNIFORM MULTI-CHIP IDENTIFICATION AND ROUTING SYSTEM

BACKGROUND OF THE INVENTION

1. Field of the Invention

This invention relates generally to semiconductor processing, and more particularly to devices and methods to enable routing of signals generated by a semiconductor chip.

2. Description of the Related Art

One type of conventional multi-chip system may consist of multiple independently manufactured chips that are later grouped on an interposer. In this conventional system, each chip may contain one or more nodes, such as a processing core, a graphics processing unit (GPU) core or other cores or memories, connected by way of an on-chip network. The on-chip network for one chip of the system may be completely different from the other networks of the system, such as in the interposer and any other chips populating the system.

A similar problem is typically encountered in motherboard level systems, where multiple disparate components are assembled on a common motherboard. In this case, some portions of the system are generic and require some form of self-identification, such as arbitrary cards plugged into PCIe slots or arbitrary USB devices, coupled with supporting software, such as drivers. Still other interfaces are largely hard-wired into the motherboard and/or chips. This requires a fixed interconnect topology, namely the fixed topology of the motherboard, support for multiple interfaces, such as PCIe, PCI, AGP, USB, SATA, DDR3, HT, etc., and complex self-identification protocols (e.g., plug-n-play, USB). These approaches may be inferior in the context of an integrated multi-chip system that uses a uniform routing substrate, such as the same interposer architecture for multiple products, has statically configured components, and needs to route low-latency memory traffic. For example, current PCIe inter-component latencies are on the order of a few hundreds of nanoseconds and thus the tens of nanoseconds required by current PCIe translation logic is tolerable. However, future 3D-stack systems will achieve sub-10 ns inter-component latencies and thus must allow for sub-ns communication mechanisms.

The present invention is directed to overcoming or reducing the effects of one or more of the foregoing disadvantages.

SUMMARY OF EMBODIMENTS OF THE INVENTION

In accordance with one aspect of an embodiment of the present invention, a method is provided that includes generating a packet with a first semiconductor chip. The packet is destined to transit a first substrate and be received by a node of a second semiconductor chip. The packet includes a packet header and packet body. The packet header includes an identification of a first exit point from the first substrate and an identification of the node. The packet is sent to the first substrate and eventually to the node of the second semiconductor chip.

In accordance with another aspect of an embodiment of the present invention, a computer-readable medium has computer-executable instructions for performing a method that includes generating a packet with a first semiconductor chip. The packet is destined to transit a first substrate and be received by a node of a second semiconductor chip. The packet includes a packet header and packet body. The packet header includes an identification of a first exit point from the first substrate and an identification of the node. The packet is sent through the first substrate to the node of the second semiconductor chip.

In accordance with another aspect of an embodiment of the present invention, an article of manufacture is provided that includes a computer-readable medium that has stored thereon a data structure. In addition, a packet includes a packet header and a packet body and destined to transit from a first semiconductor chip through a first substrate and be received by a node of a second semiconductor chip. The packet header includes an identification of a first exit point from the first substrate and an identification of the node.

In accordance with another aspect of an embodiment of the present invention, a system is provided that includes a first substrate, a first semiconductor chip coupled to the first substrate and that has a node, and a second semiconductor chip coupled to the first substrate. The second semiconductor chip is programmed to generate and send a packet through the first substrate to the node of the first semiconductor chip. The packet includes a packet header and packet body, the packet header includes an identification of a first exit point from the first substrate and an identification of the node.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Various multi-chip identification and packet routing systems are disclosed. One embodiment includes multiple semiconductor chips mounted to an interposer. Each of the chips is operable to send or receive packets or messages to/from the other semiconductor chips. A sending chip generates a packet that includes a packet body and a packet header. For example, the packet body will typically include whatever logical action is to be taken, such as reading a particular memory location, writing a particular piece of data to a particular memory location, turning on or off some circuit block or any of the other myriads of types of operations that may be performed by semiconductor chips. The packet header includes information that facilitates efficient packet routing without the need for one semiconductor chip to have a priori global information about the other semiconductor chip and vice versa. The packet header uses a naming system that provides flexibility across different implementations to allow for different chip routing algorithms, router microarchitectures, bandwidths, etc. Additional details will now be described.

Figure 1:
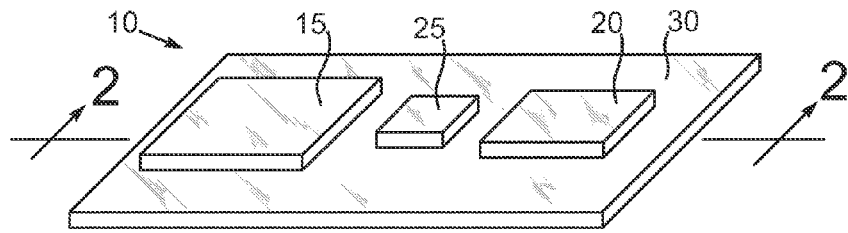
FIG. 1 is a pictorial view of an exemplary embodiment of a semiconductor chip device used to illustrate various aspects of a multi-chip communication system.

In the drawings described below, reference numerals are generally repeated where identical elements appear in more than one figure. Turning now to the drawings, and in particular to FIG. 1, therein is shown a pictorial view of an exemplary embodiment of a semiconductor chip device 10 that will be used to illustrate various aspects of an exemplary multi-chip communication system. This illustrative embodiment of the semiconductor chip device 10 may include a semiconductor chip 15, a semiconductor chip 20 and a third optional semiconductor chip 25 mounted on a substrate 30. The semiconductor chips 15 and 20 may provide virtually any electronic functionality. Thus, the semiconductor chips 15 and 20 may be microprocessors, graphics processors, combined microprocessor/graphics processors, application specific integrated circuits, memory devices or the like, and may be single or multi-core. The optional semiconductor chip 25 is designed to provide network logic to facilitate the routing of signals through the substrate 30, including those signals passing between the semiconductor chips 15 and 20. The semiconductor chips 15, 20 and 25 may be constructed of bulk semiconductor, such as silicon or germanium, or semiconductor on insulator materials, such as silicon-on-insulator materials, or even other types of materials such as graphene or others. Even insulator materials may be used for one or more of the semiconductor chips 15 and 20 in the event that such chips are themselves interposers, such as silicon dioxide, TEOS or similar materials.

The substrate 30 may be an interposer, a circuit board or other type of substrate. If configured as an interposer, the substrate 30 may be composed of the same types of materials as the semiconductor chips 15 and 20. For example, silicon as an interposer material has the advantage of having approximately the same coefficient of thermal expansion as the semiconductor chips 15, 20 and 25 if they too are composed of silicon.

Figure 2:
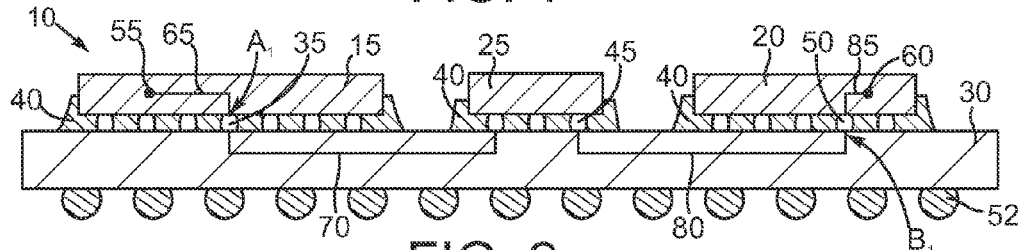
FIG. 2 is a sectional view of FIG. 1 taken at section 2-2.

Additional details of the semiconductor chip device 10 may be understood by referring now to FIG. 2, which is a sectional view of FIG. 1 taken at section 2-2. In this illustrative embodiment, the semiconductor chips 15, 20 and 25 are flip-chip mounted to the substrate 30. The semiconductor chip 15 may be electrically connected to the substrate 30 by way of plural solder joints 35. The solder joints 35 may be C4 solder bumps with or without lead, solder plus copper pillar, other conductor pillar structures or other interconnect structures as desired. An underfill material 40 may be interposed between the semiconductor chips 15, 20 and 25 and the substrate 30. The underfill material 40 may be composed of well-known epoxy materials, such as epoxy resin with or without silica fillers and phenol resins or the like. Two examples are types 8437-2 and 2BD available from Namics. The semiconductor chip 25 may be electrically connected to the substrate 30 by way of plural solder joints 45, which may be materially and structurally the same as the solder joints 35. Finally, the semiconductor chip 20 may be electrically connected to the substrate 30 by way of plural solder joints 50, which may be materially and structurally like the solder joints 35 described above. Only a few of the solder joints 35, 45 and 50 are depicted in FIG. 2. However, the skilled artisan will appreciate that depending upon the complexity and number of I/Os required for the semiconductor chips 15, 20 and 25, the number of solder joints 35, 45 and 50 may be in the scores, hundreds or even thousands. The substrate 30 may be provided with plural interconnect structures, such as the solder balls or bumps 52. Of course, other types of interconnects may be used, such as conductive pillars, pins, lands or others.

The semiconductor chips 15 and 20 may include large numbers of circuit elements, such as caches, individual memory locations, multiplexers, operational amplifiers, comparators, oscillators, adders and a huge number of other possibilities. These elements or locations within these elements may be termed nodes. An exemplary node 55 for the semiconductor chip 15 is represented schematically by the black dot and another exemplary node 60 for the semiconductor chip 20 is represented schematically by a black dot. Each of the semiconductor chips 15, 20 and 25 and the substrate 30 will typically include a large number of conductor lines or traces to route signals or messages. These conductive pathways may span multiple layers and include vertical interconnects, such as vias. Furthermore, each of the semiconductor chips 15, 20 and 25 and the substrate 30 will also typically include plural I/O sites, such as the solder joints 40, 45 and 50. Accordingly, there may be a large pool of potential pathways for message traffic between two given nodes, such as node 55 and node 60. One such potential pathway between the nodes 55 and 60 includes the line 65 in the semiconductor chip 15 from the node 55 to the solder joint 35, the line 70 in the substrate 30 from the solder joint 35 to one of the solder joints 45 of the semiconductor chip 25, the semiconductor chip 25, the line 85 in the substrate 30 between the solder joint 45 and the solder joint 50 of the semiconductor chip 20 and finally the line 70 between the solder joint 50 and the node 60. It should be understood that the various lines 65, 70, 80 and 85 are schematic representations of electrical pathways that may, as described below, include logic and other elements.

Assume for the purposes of this illustration that the semiconductor chip 15 is instructed by operating system or other code to send a message or packet from the node 55 of the semiconductor chip 15 through the substrate 30 to the node 60 of the semiconductor chip 20 using the pathway just described. The routing of the packet may be broken down into three routing sub-problems: (1) routing the packet from the node 55 to an exit site $A_1$ of the semiconductor chip 15 (also referred to as an interface site); (2) routing the packet through the substrate 30 from the exit site $A_1$ to a substrate exit site $B_1$ (also referred to as an interface site); and (3) routing the packet from the substrate exit site $B_1$ to the node 60 in the semiconductor chip 20. An exemplary generation of the packet that tackles the three routing sub-problems may be understood by referring now also to FIG. 3, which is a schematic representation of the semiconductor chip 15, the semiconductor chip 20, the semiconductor chip 25 and an exemplary packet 90. For this illustrative embodiment, the substrate 30 is configured as an interposer. As noted above, the semiconductor chips 15 and 20 may consist of large numbers of circuitry blocks. For simplicity of illustration, the semiconductor chip 15 is depicted with a main logic block 95 and a chip network logic block 100, the semiconductor chip 20 with a main logic block 105 and a chip network logic block 110 and the semiconductor chip 25 with an interposer network logic block 115. The node 55 and another exemplary node 120 of the semiconductor chip 15 are shown. Similarly, the node 60 and another exemplary node 123 of the semiconductor chip 20 are shown. The skilled artisan will appreciate that the number of nodes may be very large. The various data creation and movement processes associated with packet handling disclosed herein may be controlled by code stored on a computer-readable medium 124. The code may be shared by the semiconductor chips 15, 20 and 25 or be discrete for each of those devices. The computer-readable medium 124 may be any kind of storage, such as a floppy disk, a hard disk, an optical disk, a flash memory, a ROM, a RAM or other, and may be shared by the semiconductor chips 15, 20 and 25 or be discrete for each of those devices.

The packet 90 is propagated from the node 55 to the exit location $A_1$ by way of the line 65 and the chip network logic 100. Note that the semiconductor chip 15 includes plural possible exit points $A_1, A_2 \ldots A_1$ from which the chip network logic 100 may choose. These exits points $A_1, A_2 \ldots A_1$ may correspond physically to the various solder joints 35 also shown in FIG. 2. Any of the exit points, $A_1, A_2 \ldots A_1$ or others disclosed herein, may be logical exits. Note also that there are plural exit points $B_1, B_2 \ldots B_1$ for the interposer 30, corresponding physically to the locations of the solder joints 50 that may be used by the interposer network logic 115 to route the packet 90 to the semiconductor chip 20. From the exit location $A_1$, the packet 90 is transmitted via the solder joint 35 and the conductor 70 through the substrate or interposer 30 to the semiconductor chip 25 and the interposer network logic 115. After returning to the interposer 30 via the line 80, the packet 90 exits at location $B_1$ and via the solder joint 50 and line 85 reaches the chip network logic 110. From there, the packet 90 is routed by the chip network logic 110 to the node 60.

The structure of the exemplary packet 90 will now be described. The packet 90 includes a packet body 125 and a header 127. The packet body 125 contains information to be acted upon by the destination node 60. For example, the packet body 125 will typically include whatever logical action is to be taken, such as reading a particular memory location, writing a particular piece of data to a particular memory location, turning on or off some circuit block or any of the other myriads of types of operations that may be performed by semiconductor chips. One exemplary packet body 125 might be to write data to a memory location. The header 127 includes information that facilitates efficient packet routing without the need for one semiconductor chip 15 to have a priori global information about the other semiconductor chip 20 and vice versa. The packet header 127 may include various components depending on the complexity of the routing required to deliver the packet 90. In this example the packet header 127 may include a Source Chip Identification or "ID" 130, a Source Node ID 135, a Source Exit ID 140, an Interposer Exit ID 145, a Destination Chip ID 150 and a Destination Node ID 155 as components. These components of the header 127 will now be described.

Source Chip ID

Each of the chips 15, 20 and 25 in the semiconductor chip device 10 is assigned a unique ID. The Source Chip IDs, in this illustration the binary numbers 0000 and 0001, may be set by system BIOS at start up, stored in non-volatile memory on the semiconductor chips 15 and 20 or may be set by fuse burn in or other methods. Of course, number or identification systems other than binary may be used. Since in this illustrative embodiment, the source of the packet 90 is the semiconductor chip 15, the Source Chip ID will reflect chip 0000.

Source Node ID

Each of the nodes within a given chip has a node ID that is unique only within that chip. Thus, the chip 15 has nodes 55, 120, etc. and the chip 20 has nodes 60, 125, etc. Each chip's internal node IDs may be assigned in whatever way is appropriate for that chip. The Source Node ID 135 in this illustration may be the coordinates or other identifying information that identifies the location of the node 55. For example, the Source Node ID may be x,y coordinates, cylindrical coordinates or some other type of spatial identification system.

Source Exit ID

The Source Exit ID 140 in this illustration is the location $A_1$ where the packet 90 will exit the source chip 15. Again, the Source Exit ID 140 may like the Source Node ID 135 AND consist of x,y coordinates or other type of spatial identification parameters. The Source Exit ID 140 is selected by the chip network logic 100 based on routing decision making to be described below.

In an alternative embodiment, the Source Exit ID 140 may not actually identify any particular exit location, e.g., $A_1 \ldots$ or An. Rather, the messaging methodology does not necessarily require explicit exit/entrance specification and thus enables the source chip router 170 (with appropriate congestion feedback from the network) to select the exit/entrance points $A_1$ and $B_1$ for the purposes of load balancing, fairness/QoS (quality of service), providing differentiated levels of service, etc. The Source Exit ID 140 in such an alternative will have some special value, which denotes that any exit location $A_1 \ldots A_1$ may be used. In this case, the source chip 15 can use its own local congestion information (which is relatively easy to obtain as it only needs to collect information from within its own network/chip) to select an appropriate exit point $A_1 \ldots k$. The interposer 30 and destination chip 20 route the packet to the destination node 60 as before. In this alternative embodiment, fully-specified source routing can be supported, but any dynamically routed steps can be performed with only local congestion information, which simplifies the communication of the congestion information (i.e., each chip 15 and 20 only collects and communicates local "traffic reports" for only local intra-chip use, where each chip can use its own custom traffic collection statistics, reporting format/protocol, etc., thereby providing a more scalable distributed routing infrastructure).

Interposer Exit ID

The Interposer Exit ID 145 is the exit location $B_1$ of the interposer 30 chosen by the interposer network logic 115, and may be x,y or other coordinates as described above. The routing by the interposer 30 will be described below.

Destination Chip ID

The Destination Chip ID 150 may be the identifier of the destination semiconductor chip 20, such as the binary number 0001 shown.

Destination Node ID

Finally, the Destination Node ID 155 may be an identifier, such as x,y coordinates or other spatial parameters, that identifies the location of the destination node 60.

The source node 55 generates not only the packet body 125 but also the header 127 that includes the Source Chip ID 130, the Source Node ID 135, the Source Exit ID 140, the Interposer Exit ID 145, the Destination Chip ID 150 and the Destination Node ID 155. The semiconductor chip 15 must have advanced knowledge of the exit locations $B_1, B_2 \ldots$ and/or $B_n$ that map to the destination chip 20 in order to select a particular Interposer Exit ID 145, such as the location $B_1$. However, the semiconductor chip 15 as packet source need not have any advanced knowledge of the possible internal conducting pathways of the semiconductor chip 20, such as the conducting pathway 85. The semiconductor chip 15 need only have advanced knowledge of the Destination Chip ID 150, the Destination Node ID 155 and the Interposer Exit ID 145. Different chips can use different network configurations. Examples include ring, mesh, densely-connected, but others are possible. Each node of each of the chips 15 and 20 and the interposer 30 still uses the unified identification system, so each sub-network understands where to send the packet 90 to next, but the specific routing algorithms/paths can be specific to the topology of the sub-network in a way that all other sub-networks are completely oblivious to. Knowledge of the destination network topology is not required by the source node 55. The source node, however, does need to know which interposer nodes map to the destination chip 20, but nothing else about the interposer's topology. Knowledge of the destination network topology is not forbidden, however, since such knowledge can help the source node 55 or source chip 15 select an appropriate destination entrance node $B_1$ that minimizes intra-chip communication distance or some other objective.

In this exemplary routing methodology, the routing information to deliver the packet 90 does not require any modifications while the packet is in flight through the network. All routing decisions (for any of the three routing subproblems) need only consider the information in the header with combinatorial logic to be described below (additional information can optionally be included, such as network congestion, but is not required). An individual network may also need to use other resources such as a routing table, but these resources only include information local to this particular router so that no global information about other chips is required which would imply a priori knowledge built into the component chips prior to assembly.

Figure 3:
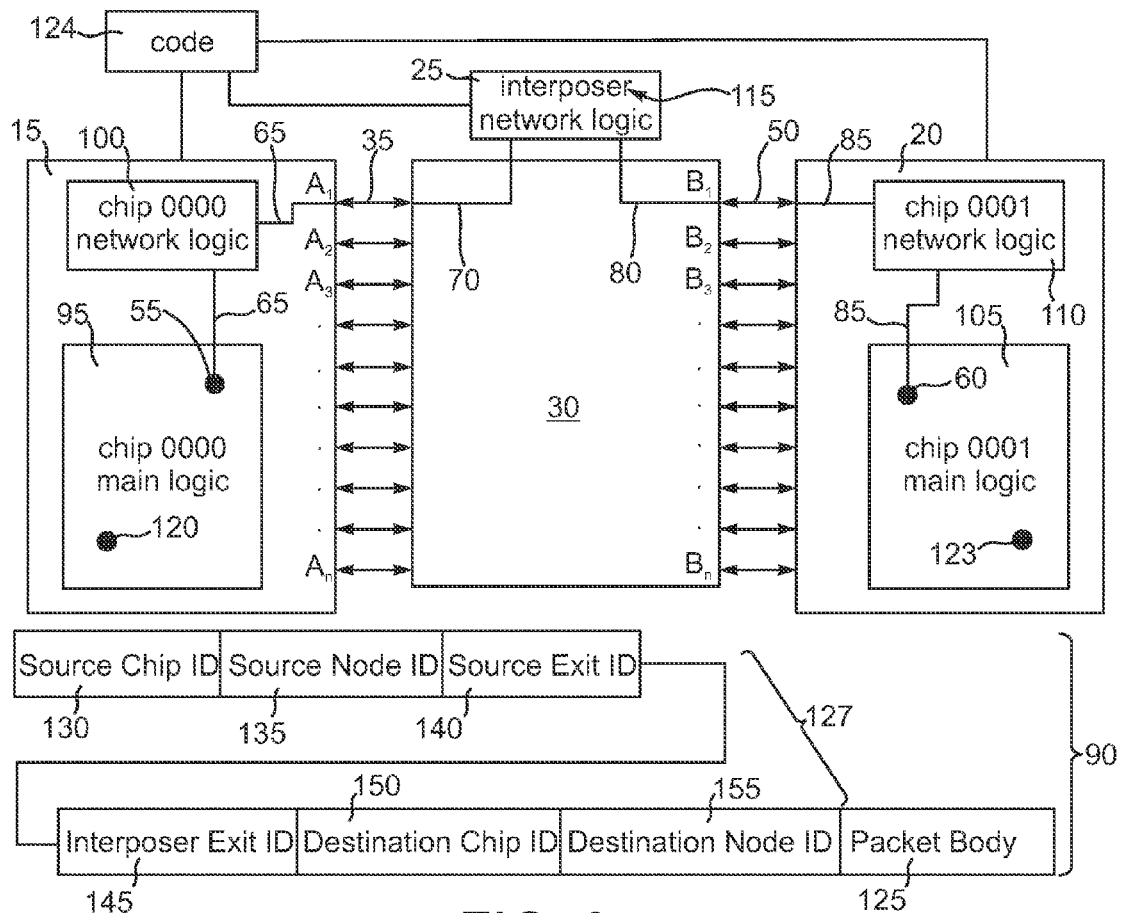
FIG. 3 is a schematic representation of three semiconductor chips and an exemplary packet or message.
Figure 4:
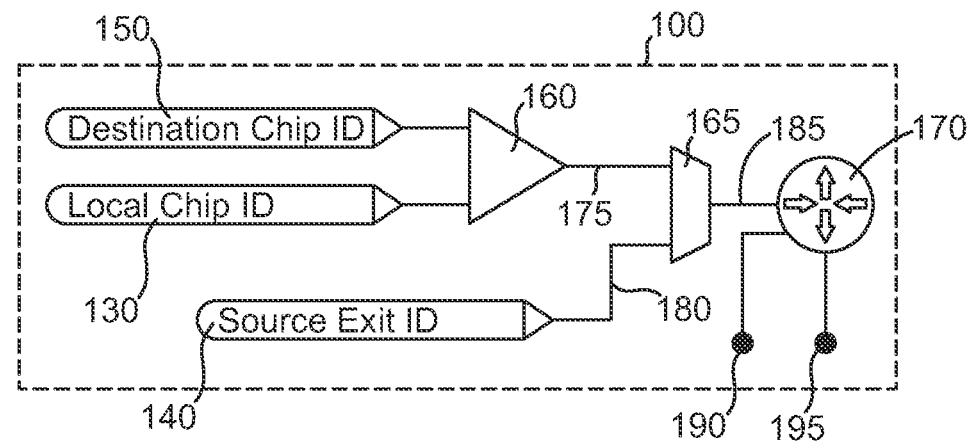
FIG. 4 is a schematic representation of exemplary network logic for the three semiconductor chips.
Figure 4:
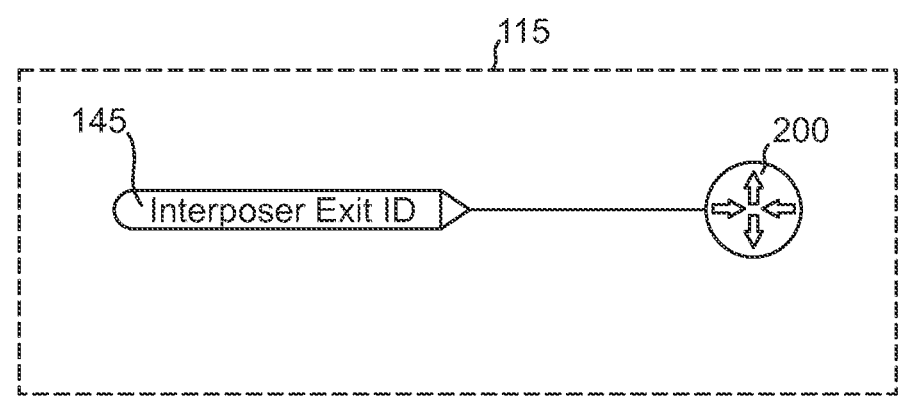
Figure 4:
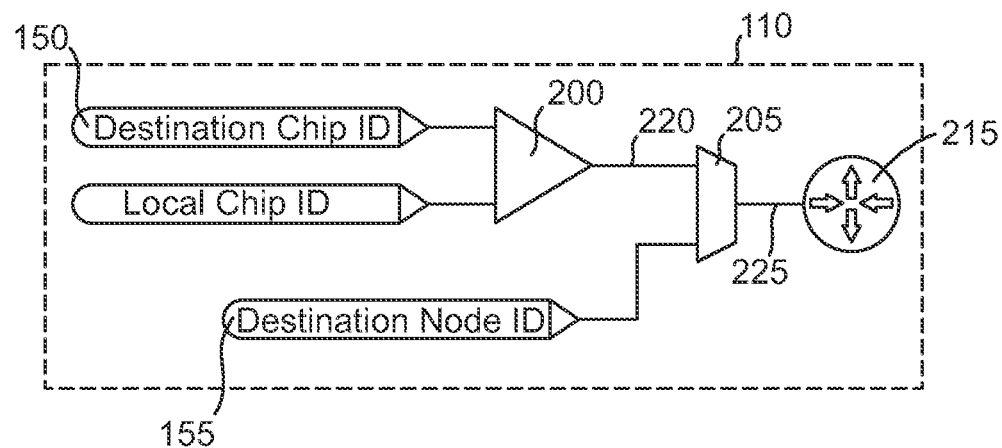

Additional details of the chip network logic 100, the chip network logic 110 and the interposer network logic 115 may be understood by referring now also to FIG. 4. The chip network logic 100 is represented schematically by the dashed box and other logic. In particular, the chip network logic 100 may include a comparator 160, a switch 165, which may be a multiplexer or other type of multi input device and a router 170. Two inputs to the comparator 160 may be the Destination Chip ID 150 and a Local Chip ID, which corresponds to the Source Chip ID 130 depicted in FIG. 3. The output of the comparator 160 provides one input 175 to the multiplexer 165. The Source Exit ID 140 provides another input 180 to the multiplexer 165. The output 185 of the multiplexer 165 is tied to the router 170. Of course, the router 170 includes multiple other inputs and outputs, two of which are shown and represented schematically by the lines 190 and 195. When the packet 90 shown in FIG. 3 is delivered to the network logic 100, the Destination Chip ID 150 and Local or Source Chip ID 130 components of the packet 190 are processed by the comparator 160. This is necessary to determine whether or not the Destination Chip ID 150 matches the Source Chip ID 130, in which case the packet 90 would not be sent off chip. Assuming that the Destination Chip ID 150 and the Source Chip ID 130 do not match, then a particular output 175 is sent to the multiplexer 165. At the same time, the Source Exit ID 140 component of the packet 90 is delivered to the input 180 of the multiplexer 165. The multiplexer 165 then transfers the results of the comparison of the Destination Chip ID 150 and source chip ID 130 and the Source Exit ID 140 to the router 170. The router 170 then routes the packet 90 to the source exit associated with the Source Exit ID 140. In this illustration, that location would correspond to the source exit $A_1$.

Still referring to FIGS. 3 and 4, the interposer network logic 122 is represented schematically by the dashed box and other logic and may include a router 200, which is operable to receive as an input the Interposer Exit ID 145 component of the packet 90 shown in FIG. 3. In this illustration, the Interposer Exit ID 145 value will correspond to the location $B_1$. The routing for the interposer network logic 115 is simple. Thus, the interposer network logic 115 will route the packet 90 to the exit location $B_1$ corresponding to the value of the Interposer Exit ID 145.

Finally, the chip network logic 110 is represented schematically by the dashed box and other logic and may include a comparator 205, a switch or multiplexer 210 and a router 215. Two inputs to the comparator 200 include the Destination Chip ID 150 and the Local Chip ID, which for the semiconductor chip 20 may be the binary number 0001. The inputs to the switch 205 may consist of the output 220 of the comparator 200 and the Destination Node ID 155 component of the packet 90. The output 225 of the switch 205 is tied to the router 215. Thus, the comparator 225 compares the Destination Chip ID 150 with the Local Chip ID and generates the output 220. Here again, the purpose of making a comparison between the Destination Chip ID 150 and the Local Chip ID is to generate a particular output that is indicative of whether the packet 90 is coming from off or within the semiconductor chip 20. In this illustration, the Destination Chip ID 150 and the Local Chip ID will be the same and thus the output 220 will reflect that finding. The output 225 of the switch 205 thus consists of the output 220 of the comparator 200 and the Destination Node ID 155. That information is passed to the router 215, which is then operable to transmit the packet 90 to the destination node, in this illustration, the node 60 shown in FIG. 3.

Still referring to FIGS. 3 and 4, the source node 55 will require a lookup table or some other facility that specifies a Source Exit ID 140 and Interposer Exit ID 145 for each Destination Chip ID 150 and Destination Node ID 155 pair. Note that for a given system, some mapping from system-level resources (e.g., a memory address range, a GPU pipeline, etc.) to a Destination Chip and Node ID is required. This mapping may be implemented in a software or hardware table. For a given interposer standard/convention, each of the fields of the packet 90 header will have a fixed width, thereby providing a limit on the maximum number of chips per system as well as the maximum number of nodes per chip. For example, if the Destination Chip ID 150 field is four bits wide and the Destination Node ID 155 field is six bits wide, then there may be a maximum of 16 chips, where each chip could contain up to 64 nodes. Depending on the range of systems to be supported for a given interposer and overall routing system specification, the widths of each of these fields could be adjusted.

Knowledge of the destination network topology is not forbidden, since such knowledge can help the source node 55 select an appropriate interposer exit, such as the location $B_1$, that minimizes inter-chip communication distance or some other objective. Depending on the complexity of the routers 170, 200 and 215 or the size of the packet header 127, it may not be desirable to have the source router 170 specify the source exit node $A_1$ (and the corresponding Source Exit ID 140) and/or interposer exit location $B_1$ (and corresponding Interposer Exit ID 145).

In another alternative embodiment, the source node 55 does not explicitly specify the Source Exit ID 140. Instead, the packet exit location for the source chip 15, such as the location $A_1$, is directly implied by the Source Node ID 135 of the source node 55 by using a subset of the ID bits. For example, if the source chip 15 has four entrance/exit nodes, then the two most significant bits of the Source Node ID 135 could specify the source exit location, again $A_1$ in this example. The same implied addressing principles can apply to the destination chip 20 and destination node 60. This provides a simple static mapping of intra-chip nodes to exit/entrance routing points, albeit while sacrificing the ability to dynamically select exit/entrance points based on, for example, the congestion observed at these points.

Figure 5:
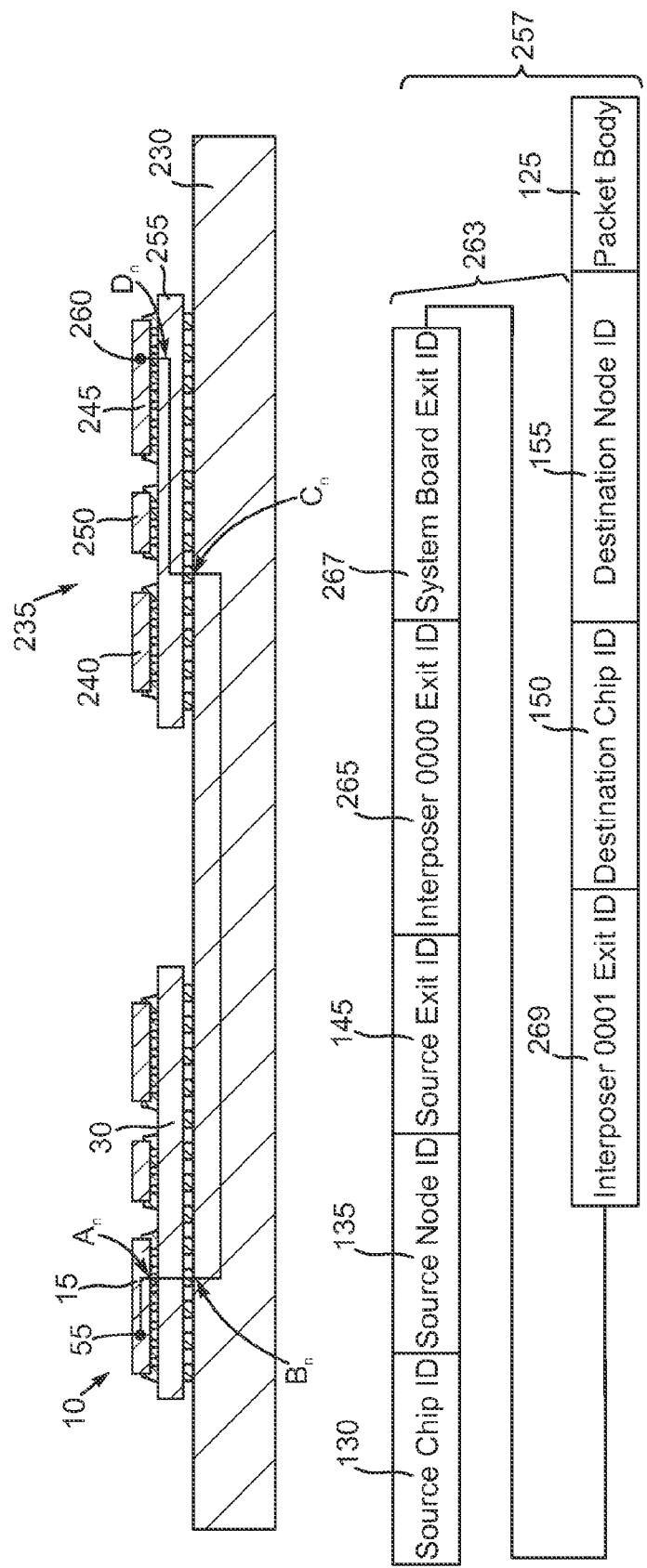
FIG. 5 is a sectional view like FIG. 2, but depicting an alternate embodiment of a semiconductor chip device that includes an additional logic layer.

The foregoing illustrative embodiment, the transmission of a packet from one semiconductor chip 15 to the other semiconductor chip 20 involves two layers, namely a logic physical layer associated with the semiconductor chips 15 and 20 and a physical layer associated with the substrate or interposer 30. However, the techniques described herein may be applied to more than two layers. In this regard, FIG. 5 depicts such as alternative embodiment, in section, and with the semiconductor chip device 10 mounted to another substrate 230, which may be a system board or other type of circuit board, another interposer or other element. Another semiconductor chip device 235, which may include semiconductor chips 240, 245 and 250 mounted on a substrate or interposer 255, is in-turn mounted to the element 230. The semiconductor chips 240, 245 and the interposer 255 may be fabricated from the same types of materials as the semiconductor chip device 10 and the interposer 255 may include the discrete semiconductor chip 250 to provide a network logic as described above. Assume for the purposes of this illustration, that the semiconductor chip 15 of the semiconductor chip device 10 is instructed by programming or otherwise to send a packet 257 (represented schematically) from the node 55 to a node 260 of the semiconductor chip 245. The packet 255 may include a packet body 265, which may be like the packet body 125 described elsewhere herein and a packet header 263, which may include a Source Chip ID 130, a Source Node ID 135, a Source Exit ID 140, a Destination Chip ID 150 and a Destination Node ID 155 all as described above in conjunction with the two-level embodiment. However, since there are now multiple interposers 30 and 255 as well as the third level or layer associated with the element 230, three additional pieces of information should be included in the packet header 263, namely, an Interposer 0000 Exit ID 265 associated with the interposer 30, a System Board Exit ID 267 associated with the element or system board 230, and an Interposer Exit ID 269 associated with the interposer 255. The substrate 30 may be provided with some unique identifier, such as the binary number 0001 and the substrate 255 may be provided with some unique identifier such as the number binary 0001. These identifiers 0000 and 0001 may be determined in the same fashion as the chip identifiers 0000 and 0001 for the semiconductor chips 15 and 20 described above. In general, a system with N layers would contain N layers of identifiers to specify the packet destination and any desired intermediate routing information. As disclosed elsewhere herein, the Source Exit ID 145 specifies the coordinates of an exit location $A_n$ from the source chip 15 for the packet 257. The Interposer 0000 Exit ID 265 identifies the coordinates of an exit location $B_n$ from the interposer 30 for the packet 257. The System Board Exit ID 267 identifies the coordinates of an exit location $C_n$ from the system board 230 for the packet 257. Finally, the Interposer 0001 Exit ID 269 identifies the coordinates of an exit location $D_n$ from the interposer 255 for the packet 257. As with the other disclosed embodiments, less than fully explicit routing can be used.

Figure 6:
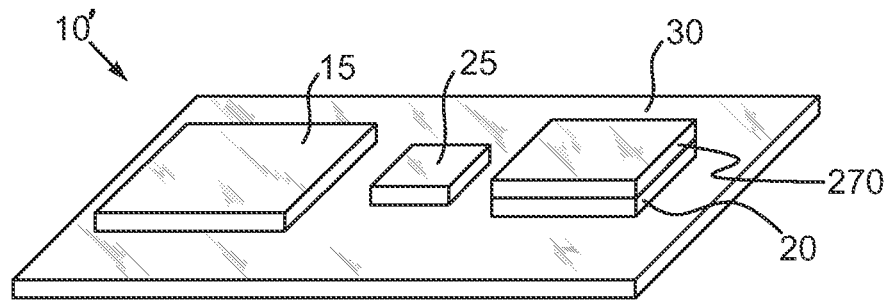
FIG. 6 is a pictorial view of an alternate exemplary embodiment of a semiconductor chip device.

The semiconductor chip devices described herein may take on a great variety of configurations. In the embodiment illustrated in FIGS. 1 and 2, the semiconductor chip device 10 includes semiconductor chips 15, 20 and 25 mounted on the substrate 30. An alternate exemplary embodiment of a semiconductor chip device 10' is illustrated pictorially in FIG. 6. This illustrative embodiment may include the semiconductor chip 15, the semiconductor chip 20 and the semiconductor chip 25 mounted on the substrate 30. However, another semiconductor chip 270 may be mounted on the semiconductor chip 20 and interconnected thereto by thru silicon vias, wire bonds or virtually any other type of interconnect device. Optionally, the semiconductor chip 270 need not be directly electrically connected to the semiconductor chip 20 but instead electrically connected to the substrate 30 by way of the interposer.

Figure 7:
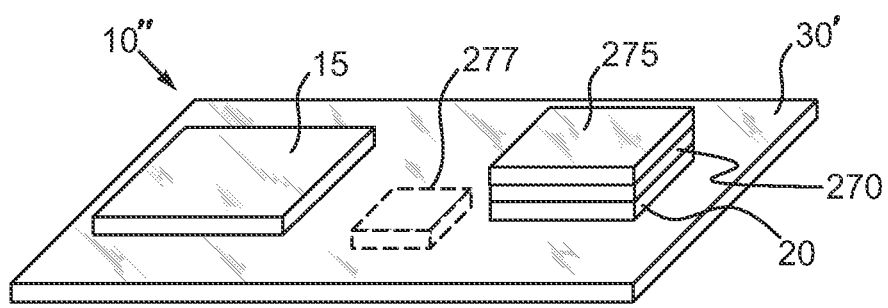
FIG. 7 is a pictorial view of another alternate exemplary embodiment of a semiconductor chip device.

Another exemplary embodiment of a semiconductor chip device 10" is depicted pictorially in FIG. 7. Here, the semiconductor chip 15 and the semiconductor chip 20 may be mounted on the substrate 30. In addition, the semiconductor chip 270 and another semiconductor chip 275 may be stacked on the semiconductor chip 20 and interconnected by thru silicon vias or by wire bonds or other conductor structures or even via the substrate 30. Here, the substrate 30' may be provided with network logic 277 imbedded as opposed to provided in a discrete semiconductor chip such as the chip 25 depicted in the embodiments of FIGS. 1 and 6.

Figure 8:
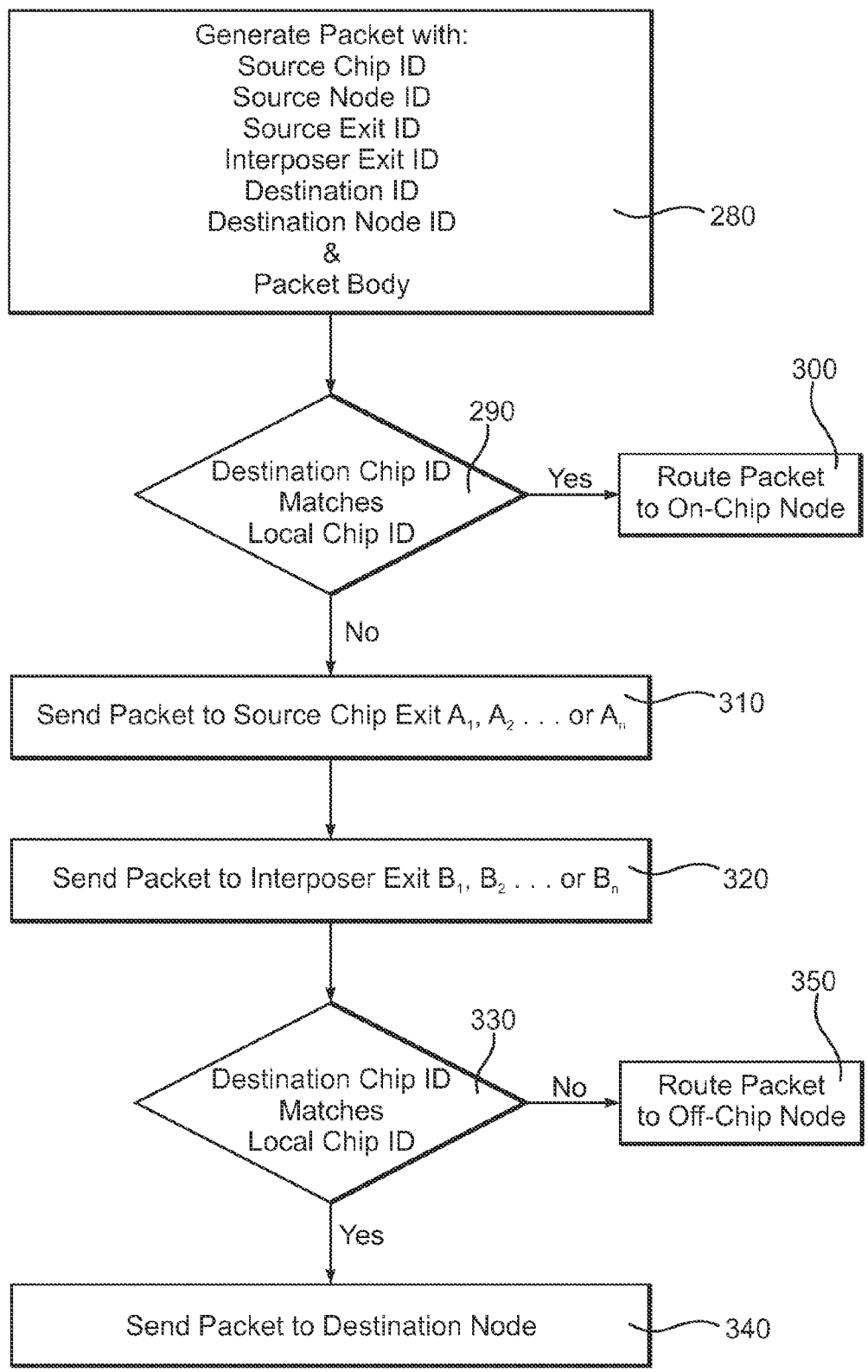
FIG. 8 is a flow chart of an exemplary packet handling scheme.

Exemplary packet handling for an exemplary embodiment is summarized in the flow chart of FIG. 8. The steps depicted in FIG. 8 may be understood by referring also to FIG. 3. At step 280, a source chip 15 (FIG. 3) generates a packet with header components Source Chip ID, Source Node ID, Source Exit ID, Interposer Exit ID, Destination Chip ID and Destination Node ID, and a packet body. At step 290, the packet is examined by the source chip network logic 100 (FIG. 3) and a determination if the Destination Chip ID matches the Local Chip ID. If there is a match, then at step 300 the packet is routed to an on-chip node. If the Destination Chip ID does not match the Local Chip ID in step 290 then at step 310 the packet is sent by the network logic 100 (FIG. 3) to a source chip exit $A_1, A_2 \ldots$ or $A_n$, etc. At step 320, the packet is sent to an interposer exit location $B_1, B_2$, etc. Next at step 330, if the Destination Chip ID matches the Local Chip ID as determined by the destination chip network logic 110 (FIG. 3), then the packet is sent to the destination node at step 340. If the Destination Chip ID does not match the Local Chip ID, then the chip network logic 110 (FIG. 3) routes the packet to an off-chip node. Again this exemplary sequence of steps utilizes a relatively full and explicit routing sequence. However, as noted elsewhere herein, some of the routing information may be either excluded from step 280 or implied by various techniques.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method, comprising:
   generating a packet with a first semiconductor chip, the packet destined to transit a first substrate and be received by a node of a second semiconductor chip, the packet including a packet header and packet body, the packet header including an identification of a first exit point from the first substrate and an identification of the node; and
   sending the packet to the first substrate.

2. The method of claim 1, comprising sending the packet through the first substrate to the node of the second semiconductor chip.

3. The method of claim 1, wherein the packet header includes an identification of an exit point for the packet from the first semiconductor chip.

4. The method of claim 1, wherein the packet header includes an identification of the first semiconductor chip, an identification of a node of the first semiconductor chip that generates the packet, an identification of an exit point for the packet from the semiconductor chip, and an identification of the second semiconductor chip.

5. The method of claim 1, wherein the packet is destined to transit in sequence the first substrate, a second substrate and a third substrate, the packet header including an identification of an exit point from the second substrate and exit point from the third substrate.

6. The method of claim 1, wherein the substrate comprises an interposer or a circuit board.

7. A computer readable medium having computer-executable instructions for performing a method comprising:
generating a packet with a first semiconductor chip, the packet destined to transit a first substrate and be received by a node of a second semiconductor chip, the packet including a packet header and packet body, the packet header including an identification of a first exit point from the first substrate and an identification of the node; and
sending the packet through the first substrate to the node of the second semiconductor chip.

8. The computer-readable medium of claim 7, wherein the packet header includes an identification of an exit point for the packet from the first semiconductor chip.

9. The computer-readable medium of claim 7, wherein the packet header includes an identification of the first semiconductor chip, an identification of a node of the first semiconductor chip that generates the packet, an identification of an exit point for the packet from the semiconductor chip, and an identification of the second semiconductor chip.

10. The computer-readable medium of claim 7, wherein the packet is destined to transit in sequence the first substrate, a second substrate and a third substrate, the packet header including an identification of an exit point from the second substrate and exit point from the third substrate.

11. The computer-readable medium of claim 7, comprising a floppy disk, a hard disk, an optical disk, a flash memory, a ROM or a RAM.

12. An article of manufacture, comprising:
a computer-readable medium having stored thereon a data structure; and
a packet including packet header and a packet body and destined to transit from a first semiconductor chip through a first substrate and be received by a node of a second semiconductor chip, the packet header including an identification of a first exit point from the first substrate and an identification of the node.

13. The article of manufacture of claim 12, wherein the packet header includes an identification of an exit point for the packet from the first semiconductor chip.

14. The article of manufacture of claim 12, wherein the packet header includes an identification of the first semiconductor chip, an identification of a node of the first semiconductor chip that generates the packet, an identification of an exit point for the packet from the semiconductor chip, and an identification of the second semiconductor chip.

15. The article of manufacture of claim 12, wherein the packet is destined to transit in sequence the first substrate, a second substrate and a third substrate, the packet header including an identification of an exit point from the second substrate and exit point from the third substrate.

16. The article of manufacture of claim 12, wherein the computer-readable medium comprises a floppy disk, a hard disk, an optical disk, a flash memory, a ROM or a RAM.

17. A system, comprising:
a first substrate;
a first semiconductor chip coupled to the first substrate and having a node; and
a second semiconductor chip coupled to the first substrate and programmed to generate and send a packet through the first substrate to the node of the first semiconductor chip, the packet including a packet header and packet body, the packet header including an identification of a first exit point from the first substrate and an identification of the node.

18. The system claim 17, wherein the packet header includes an identification of an exit point for the packet from the first semiconductor chip.

19. The system of claim 17, wherein the packet header includes an identification of the first semiconductor chip, an identification of a node of the first semiconductor chip that generates the packet, an identification of an exit point for the packet from the semiconductor chip, and an identification of the second semiconductor chip.

20. The system of claim 17, comprising a second substrate coupled to the first substrate and third substrate coupled to the second substrate, the second semiconductor chip coupled to the third substrate, the packet is destined to transit in sequence the first substrate, a second substrate and a third substrate, the packet header including an identification of an exit point from the second substrate and exit point from the third substrate.

21. The method of claim 17, wherein the substrate comprises an interposer or a circuit board.

* * * * *